United States Patent

Huang et al.

[11] Patent Number: 6,082,506
[45] Date of Patent: Jul. 4, 2000

[54] BREAKING ARRANGEMENT FOR ELEVATING WORK PLATFORM

[76] Inventors: Pei Ping Huang, 68-17, Shin Lian, Poh Tzyy City, jia Yih Shyuan; Pei Kai Huang, 68-17, Shin lian, Poh Tzyy City, Jia Yih Shyuan; Ching Huan Chen, 401, Jong Jou, Shyue Jen Town Tainan Shyuan, all of Taiwan

[21] Appl. No.: 09/106,322

[22] Filed: Jun. 29, 1998

[51] Int. Cl.7 .................................................. B60T 8/72
[52] U.S. Cl. ...................... 188/189; 188/136; 187/372; 187/376
[58] Field of Search .................. 188/41, 43, 44, 188/180, 188, 189, 135, 136, 139, 82.1, 82.8, 82.84, 65.1, 343; 187/372, 376, 350, 351

[56] References Cited

U.S. PATENT DOCUMENTS

| | | | |
|---|---|---|---|
| 4,176,826 | 12/1979 | Gray et al. | 188/189 |
| 4,696,375 | 9/1987 | Matthews et al. | 187/58 |
| 5,224,570 | 7/1993 | Fromberg | 187/88 |
| 5,645,142 | 7/1997 | Kraemer et al. | 188/136 |

*Primary Examiner*—Robert Oberteiter
*Assistant Examiner*—Mariano Sy
*Attorney, Agent, or Firm*—Raymond Y. Chan; David and Raymond

[57] ABSTRACT

A breaking arrangement for elevating work platform includes a break body, a C-shaped receiving piece, a breaking unit, and a break released handle. The breaking arrangement allows only upward movement of the elevating work platform during normal operation, the construction workers can move downward after a break released handle is released. The breaking arrangement can further provided an emergency stop when failure occur in the main suspension cable or the winding machine, so that the elevating work platform would not slide down.

1 Claim, 6 Drawing Sheets

BREAKING ARRANGEMENT FOR ELEVATING WORK PLATFORM

FIELD OF THE PRESENT INVENTION

The present invention relates to a braking arrangement, and more particularly to a braking arrangement for elevating work platform which allows only upward movement of the elevating work platform during normal operation, the construction workers can move downward after a break released handle is released. The braking arrangement can further provided an emergency stop when failure occur in the main suspension cable or the winding machine, so that the elevating work platform would not slide down.

BACKGROUND OF THE PRESENT INVENTION

The conventional method for elevator construction inside a building (such as by rail guiding or piping wiring) is to first construct a scaffold within the elevator room that allows the construction worker to maneuver and transport equipment. However, the scaffold construction not only take long time to complete, but also when the project is completed, the scaffold would need to be taken down, thus not only economical inefficient but also time consuming. Therefore, many elevator construction process or machinery that does not use the scaffold is being invented to replace the conventional elevator construction method.

No matter what type of construction method, the main machinery used for elevator construction is by a winding machine guiding a main suspension cable of an elevating work platform. In order to maintain balance of the elevating work platform, there are usually additional supporting suspension cables connected to the elevating work platform to guide and avoid the spinning rotation of the elevating work platform. Of course, base on different construction conditions, the elevator guide rails that are already installed can also be used to replace the additional supporting suspension cable.

In the construction business, one can never be too cautious because there is just no minor accident in this field. In order to prevent the chance of falling elevating work platform due to brake of the main suspension cable or failure of the winding machine, all the elevating work platforms are provided with the conventional braking arrangement. The conventional braking arrangement comprises a breaking unit to be engaged with each additional supporting suspension cables, a centering gear, and an eccentric uni-direction ratchet is coaxially provided in respect to the braking unit, wherein the eccentric uni-direction ratchet is for locking onto the additional supporting suspension cables and the centering gear is engaged with a rack of the main suspension cable, where a bottom side of the rack is connected to a flexible material.

When the main suspension cable is broken, the flexible material provided the rack a downward pulling force, which driven the centering gear and the eccentric uni-direction ratchet to locking onto the additional supporting suspension cables. Although the above describe mechanism can accomplish the design function, however, it does not provided a braking function while the elevating work platform is moving to certain position. The function of the above describe mechanism is only limited to when the main suspension cable is broken, and the braking arrangement can provide emergency stop. In the situation when the break of the winding machine is malfunctioned, the elevating work platform would not be able to stop but fall down because the conventional braking arrangement is not designed to protect against such condition. Furthermore, the eccentric uni-direction ratchet that locked on the additional supporting suspension cables would alter the original form of the cables, thus make the cables become useless. Also if the guide rails were used to replace the additional supporting suspension cables, the conventional braking arrangement would not be able to provide service.

SUMMARY OF THE PRESENT INVENTION

The main objective of the present invention is to provide a braking arrangement for providing brake to the elevating work platform, which is guided by the guide rails or the additional supporting suspension cable of the elevator work platform within the elevator room without the present of any scaffold during construction.

Another objective of the present invention is to provide a braking arrangement for elevating platform structure, which is able to fix the elevating work platform at any predetermined height inside of the elevator room for allowing the construction workers to perform their job duties. The braking arrangement normally only allowed the elevating work platform to have an upward movement, so that when the brake of the winding machine fails, the elevating work platform would be locked in position.

Another objective of the present invention is to provide a braking arrangement for elevating platform structure, which provide a brake released handle for allowing the elevating to move downwardly when the brake released handle is released.

Accordingly, a breaking arrangement for elevating work platform comprises a brake body, a C-shaped receiving piece, a braking unit, and a brake released handle, wherein the brake body comprises a top surface, a bottom surface, a front surface, a rear surface, a first side surface, and a second side surface form six surfaces of the brake body; the brake body having a gain passing through from the top surface to the bottom surface with a narrower top portion near the top surface, and a wider bottom portion near the bottom surface.

The gain is limited and defined by a front wall parallel to the front surface of the brake body, a rear wall parallel to the front wall, a vertical wall parallel to the first side wall of the brake body, and an inclined wall disposed oppositely to the vertical wall. The front wall and the rear wall each respectively provided a front slide way and a rear slide way parallel to the inclined wall. The front surface of the brake body having an opening for providing an access to the gain. The brake body further having a counter bore penetrates through the first side surface of the brake body until the vertical wall of the gain.

The C-shaped receiving piece having a screw hole in aligned with the counter bore of the brake body on the first side surface, and a C-shaped groove facing the inclined wall of the brake body when the C-shaped receiving piece is affixed on the vertical wall within the gain of the brake body through a counter sunk bolt penetrating through the counter bore to be screwed on the screw hole of the C-shaped receiving piece.

The breaking unit comprises a brake mount having a width slightly smaller than a distance between the front wall and the rear wall of the gain of the brake body, two roller support stands having an axial hole at each of the roller support stands respectively, are parallelly and integrally extended from a first end of the brake mount, a roller having a coarse surface is pivotally mounted between two roller support stands by a pivot axle penetrating through the axial hole of the roller support stands and the roller, and a fulcrum bar integrally extended from a second end of the brake mount, wherein the pivot axle has a length that is longer than a distance between two parallel roller support stands, a protruded portion of the pivot axle is rotatably mounted in the front slide way and the rear slide way of the gain of the brake body, so that the roller is able to rotate on the inclined wall of the gain.

The brake released handle has a front end pivotally connected to the fulcrum bar of the braking unit, a middle portion pivotally mounted on the elevating work platform. During normal operation of the elevating work platform, the brake released handle is pushed upward which control the fulcrum bar to also push upward, so that the elevating work platform is only able to move upwardly. When the construction worker released the brake released handle from a rear end of the brake released handle, the fulcrum bar is turned down so that the braking unit is released and the elevating work platform can safely move downwardly.

DETAILED DESCRIPTION OF THE PREFERRED EMBODIMENT

Figure 1:
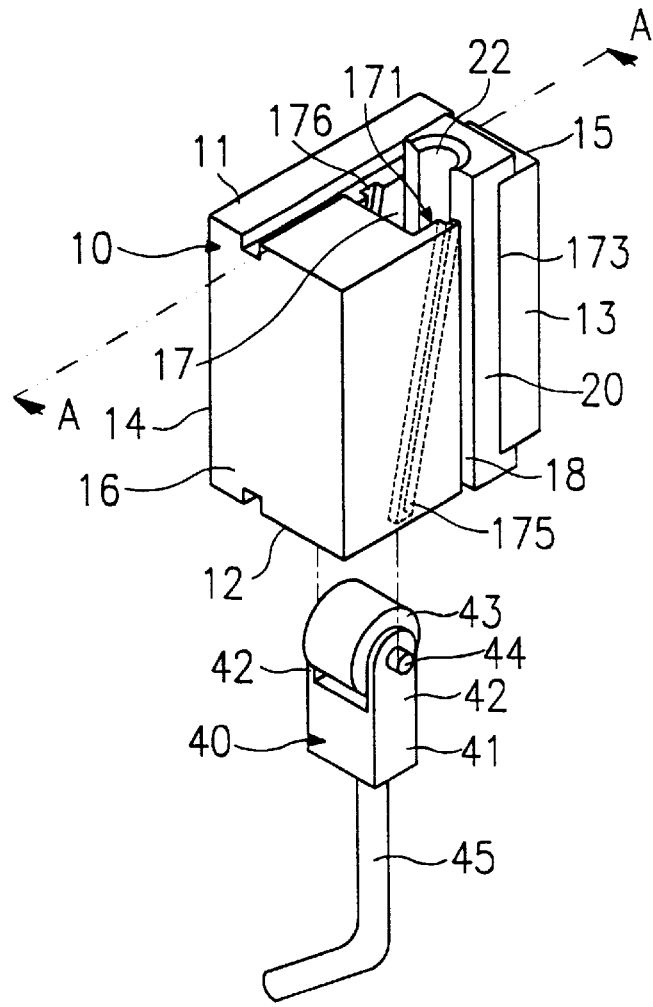
FIG. 1 is a perspective view of a braking arrangement for elevating work platform structure according to a first preferred embodiment of the present invention.
Figure 3:
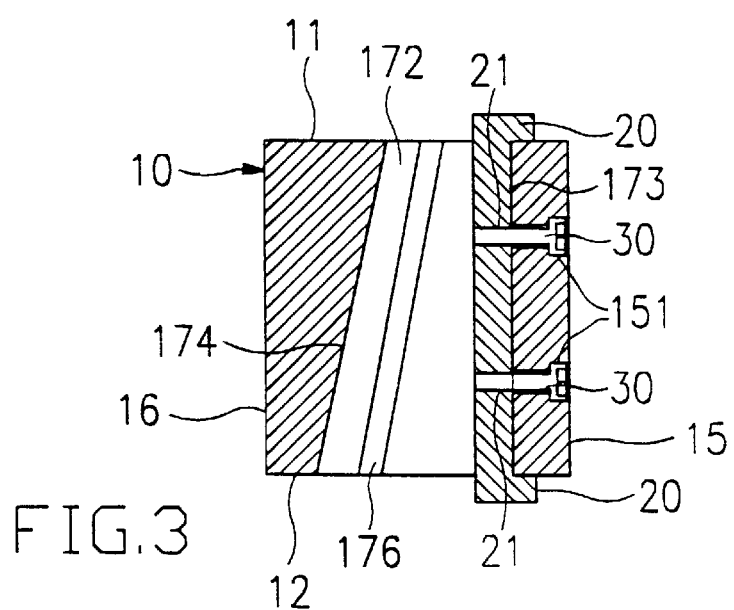
FIG. 3 is a section end view along sectional line A—A of FIG. 1 according to the above first preferred embodiment of the present invention.
Figure 2:
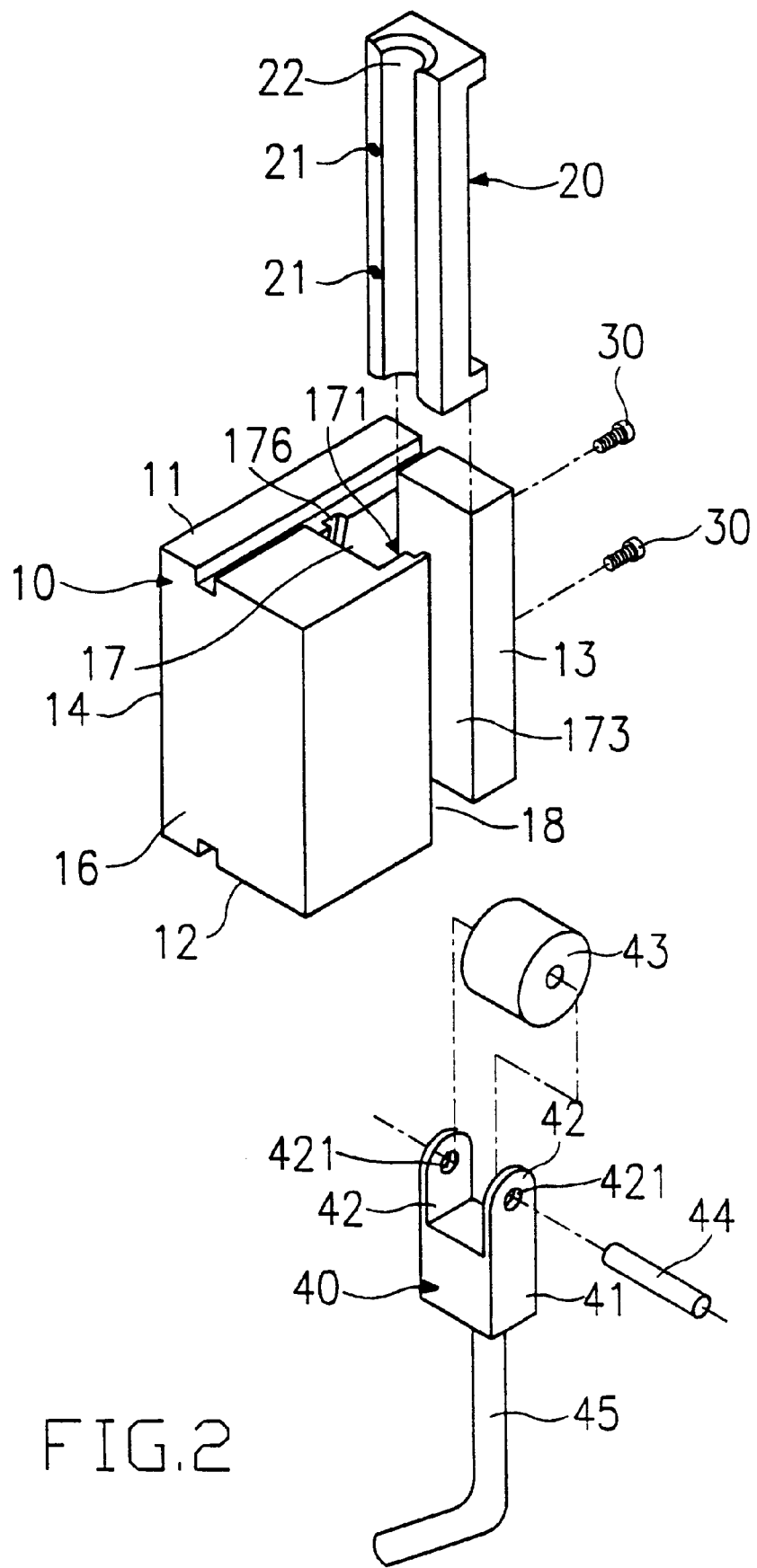
FIG. 2 is an exploded view of the braking arrangement for elevating work platform structure according to the above first preferred embodiment of the present invention.
Figure 4:
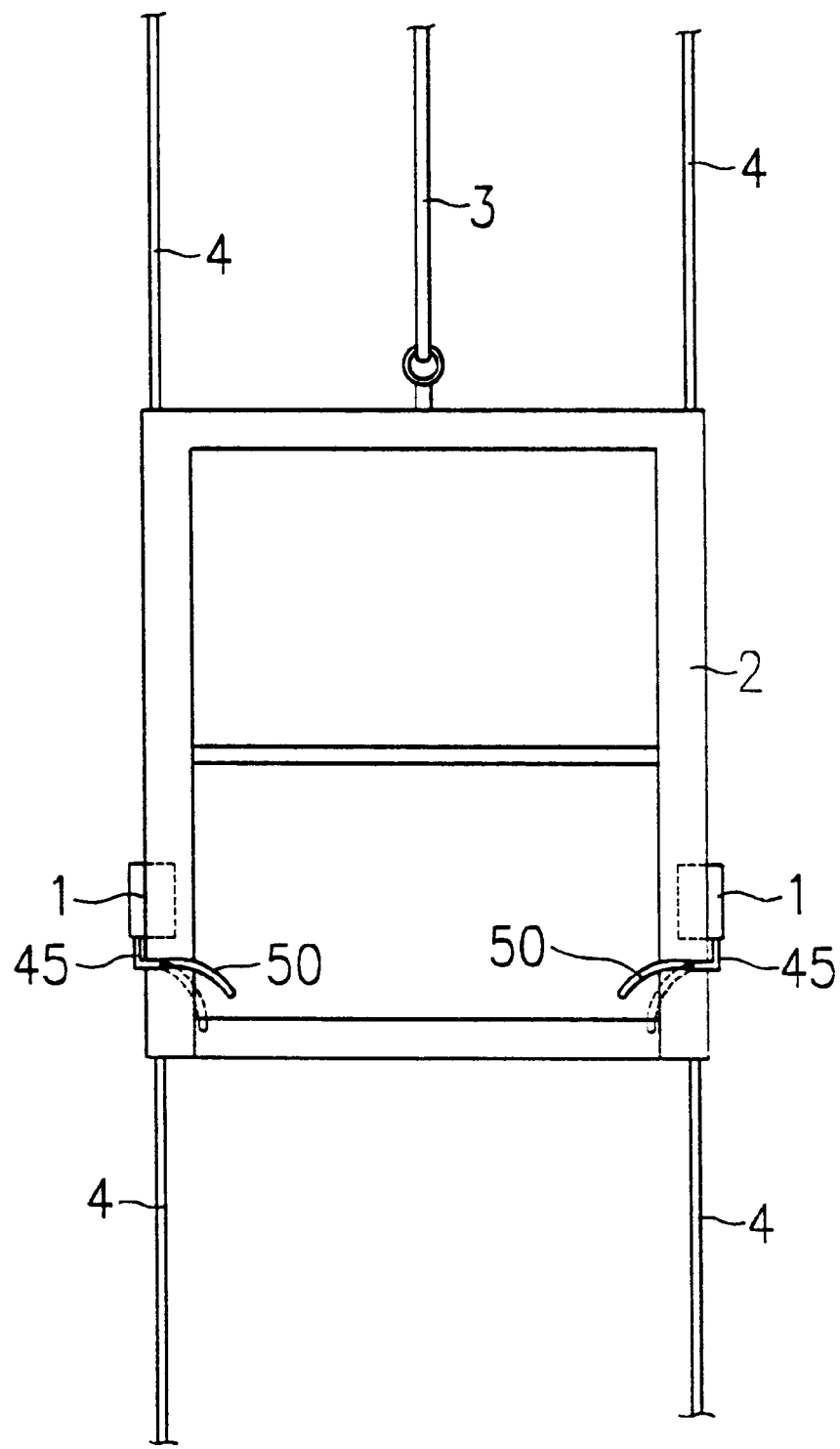
FIG. 4 is a front view of the braking arrangement adapted on the elevating work platform structure according to the above first preferred embodiment of the present invention.

Referring to FIGS. 1 to 4 of the drawings, a braking arrangement for elevating work platform structure according to a first preferred embodiment of the present invention is illustrated. The braking arrangement 1 is installed in pair on two sides of an elevating work platform 2, where a vertical movement of the elevating work platform 2 is controlled by a winding machine (not shown in FIGS) through a main suspension cable 3, and a plurality of addition supporting suspension cables 4 are provided at both sides of the elevating work platform 2 for supporting.

Each braking arrangement 1 comprises a brake body 10, a C-shaped receiving piece 20, a braking unit 40, and a brake released handle 50, wherein the brake body 10 comprises a top surface 11, a bottom surface 12, a front surface 13, a rear surface 14, a first side surface 15, and a second side surface 16 form six surfaces of the brake body.

The brake body 10 having a gain 17 passing through from the top surface 11 to the bottom surface 12 with a narrower top portion near the top surface 11, and a wider bottom portion near the bottom surface 12. The gain 17 is limited and defined by a front wall 171 parallel to the front surface 13 of the brake body 10, a rear wall 172 parallel to the front wall 171, a vertical wall 173 parallel to the first side wall 15 of the brake body 10, and an inclined wall 174 disposed oppositely to the vertical wall 173. The front wall 171 and the rear wall 172 each respectively provide a front slide way 175 and a rear slide way 176 parallel to the inclined wall 174. The front surface 13 of the brake body 10 having an opening 18 for providing an access to the gain 17. The brake body 10 further having a counter bore 151 penetrates through the first side surface 15 of the brake body 10 until the vertical wall 171 of the gain.

The C-shaped receiving piece 20 having a screw hole 21 in aligned with the counter bore 151 of the brake body 10 on the first side surface 15, and a C-shaped groove 22 facing the inclined wall 174 of the brake body 10 when the C-shaped receiving piece 20 is affixed on the vertical wall 173 within the gain 17 of the brake body 10 through a counter sunk bolt 30 penetrating through the counter bore 151 to be screwed on the screw hole 21 of the C-shaped receiving piece 20.

The breaking unit 40 comprises a brake mount 41 having a width slightly smaller than a distance between the front wall 171 and the rear wall 172 of the gain 17 of the brake body 10. two roller support stands 42 having an axial hole 421 at each of the roller support stands 42 respectively, are parallelly and integrally extended from a first end of the brake mount 41, a roller 43 having a coarse surface is pivotally mounted between two roller support stands 42 by a pivot axle 44 penetrating through the axial hole 421 of the roller support stands 42 and the roller 43. and a fulcrum bar 45 integrally extended from a second end of the brake mount 41, wherein the pivot axle 44 has a length that is longer than a distance between two parallel roller support stands 42, a protruded portion of the pivot axle 44 is rotatably mounted in the front slide way 175 and the rear slide way 176 of the gain 17 of the brake body 10, so that the roller 43 is able to rotate on the inclined wall 174 of the gain 17.

The brake released handle 50 has a front end pivotally connected to the fulcrum bar 45 of the braking unit 40, a middle portion pivotally mounted on the elevating work platform 2. During normal operation of the elevating work platform 2, the brake released handle 50 is pushed upward which control the fulcrum bar 45 to also push upward so that the elevating work platform 2 is only able to move upwardly. When the construction worker released the brake released handle 50 from a rear end of the brake released handle 50, the fulcrum bar 45 is turned down so that the braking unit 40 is released and the elevating work platform 2 can safely move downwardly.

Figure 5:
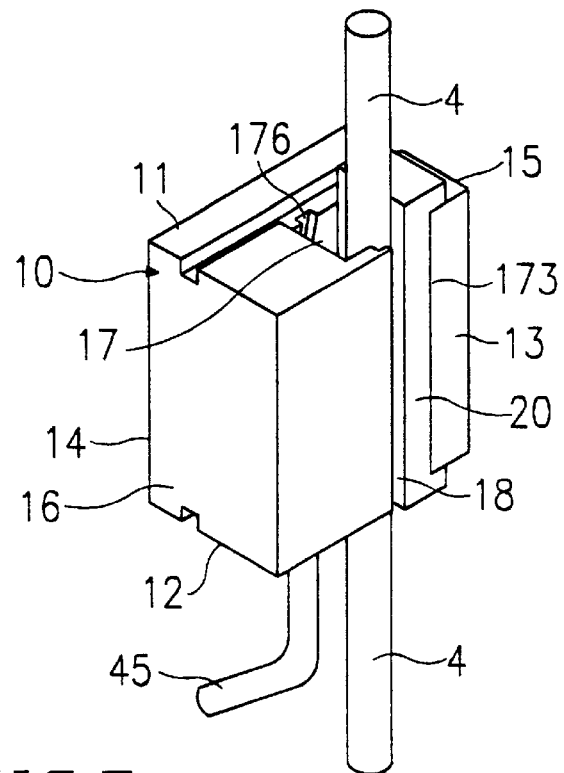
FIG. 5 is a perspective view of an illustration of a relationship between the braking arrangement and an additional supporting suspension cable according to the above first preferred embodiment of the present invention.
Figure 6:
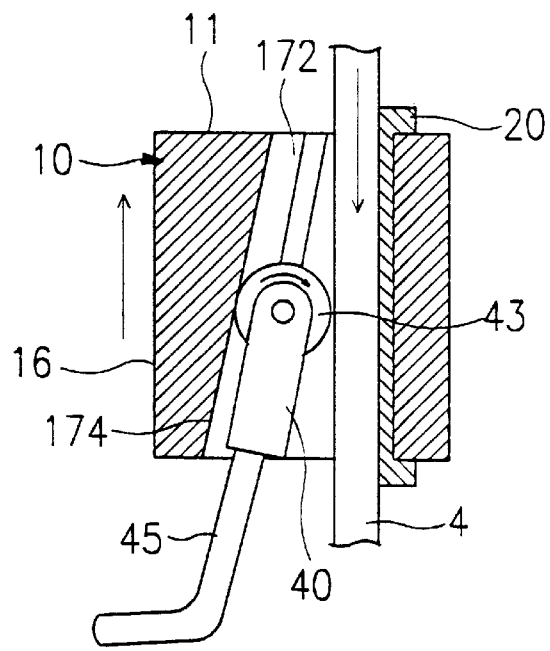
FIG. 6 is a sectional view of an illustration of the relationship between the braking arrangement and the additional supporting suspension cable according to the above first preferred embodiment of the present invention, where the additional supporting suspension cable is moving downwardly, the braking arrangement is moving upwardly, and a roller is rotating clockwisely.

Referring to FIGS. 4 to 7 of the drawings, when the elevating work platform 2 is supported by the additional supporting suspension cable 4, the additional supporting suspension cable 4 is passed through the gain 17 of the brake body 10 (as shown in FIG. 5), and is in contacted with the C-shaped groove 22 of the C-shaped receiving piece 20 and the roller 43 of the braking unit 40. As the elevating work platform 2 is moving upwardly in uni-direction by the winding machine pulling the main suspension cable 3, the brake arrangement 1 is also moving upwardly along with the elevating work platform 2, the additional supporting suspension cable 4 is moving downwardly which drive the roller 43 to rotate in a clockwise direction (as shown in FIG. 6). The roller 43 would move down to the wider bottom portion of the gain 17, thus the elevating work platform 2 can continuously move upwardly.

Figure 7:
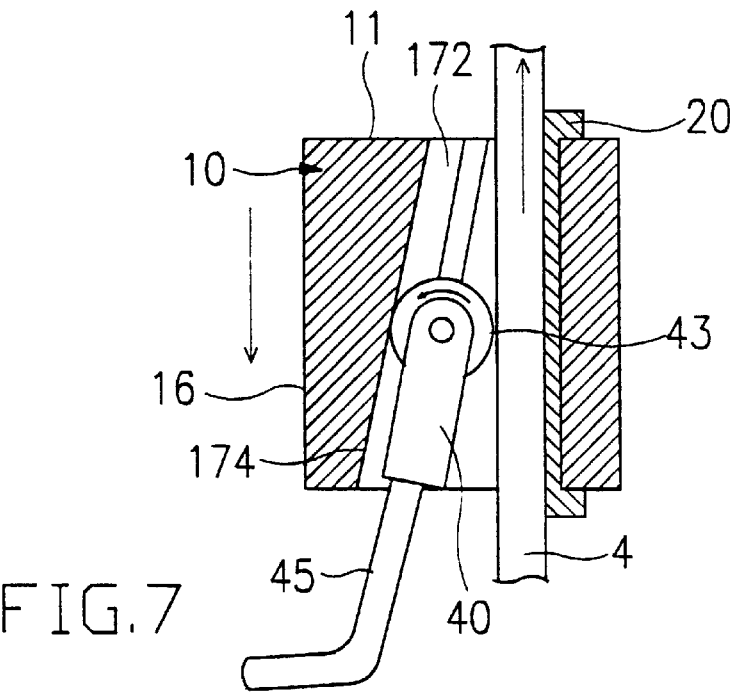
FIG. 7 is a sectional view of an illustration of the relationship between the braking arrangement and the additional supporting suspension cable according to the above first preferred embodiment of the present invention, where the additional supporting suspension cable is moving upwardly, the braking arrangement is moving downwardly, and a roller is rotating counterclockwisely.

When the winding machine is overloaded, or its brake is failed, the elevating work platform 2 would start to slide downwardly that would also bring the brake arrangement 1 to slide downwardly. The additional supporting suspension cable 4 however is moving in an upwardly direction which drive the roller 43 to rotate in a counterclockwise direction (as shown in FIG. 7). The roller 43 would move up to the narrower top portion of the gain 17, and shortly locked the additional supporting suspension cable 4 with the C-shaped groove 22 of the C-shaped receiving piece 20 to stop the downward movement of the elevating work plattorm 2.

Figure 8:
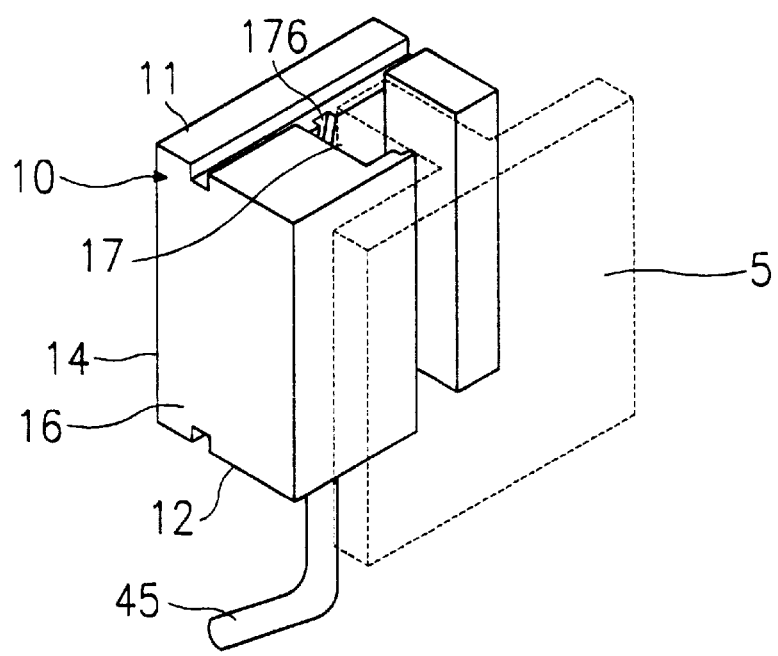
FIG. 8 is a perspective view of an illustration of a relationship between the braking arrangement and a guide rail according to the above first preferred embodiment of the present invention.
Figure 9:
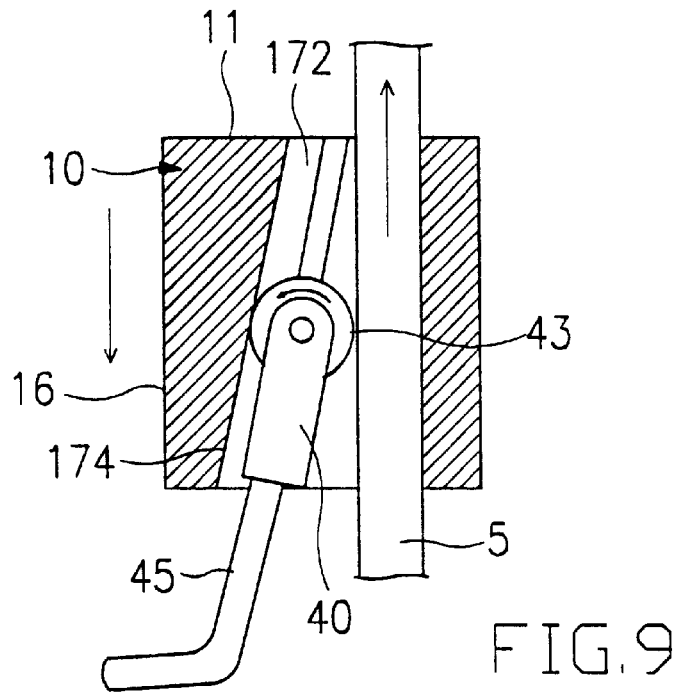
FIG. 9 is a sectional view of an illustration of the relationship between the braking arrangement and the guide rail according to the above first preferred embodiment of the present invention, where the guide rail is moving downwardly, the braking arrangement is moving upwardly, and a roller is rotating clockwisely.
Figure 10:
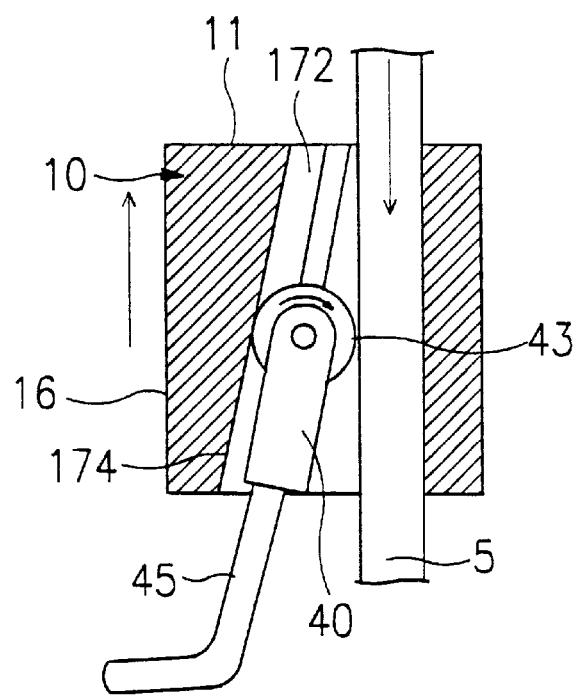
FIG. 10 is a sectional view of an illustration of the relationship between the braking arrangement and the guide rail according to the above first preferred embodiment of the present invention, where the guide rail is moving upwardly, the braking arrangement is moving downwardly, and a roller is rotating counterclockwisely.

Referring to FIGS. 8 to 10 of the drawings, when the elevating work platform 2 is supported by the guide rail 5, and moving upwardly in uni-direction by the winding machine pulling the main suspension cable 3, the above describe C-shaped receiving piece 20 can be eliminated. The guide rail 5 can be directly positioned within the gain 17 of the brake body 10 (as shown in FIG. 8) and be in contacted with the vertical wall 173 of the gain 17 and the roller 43 of the braking unit 40. As the elevating work platform 2 is moving upwardly in uni-direction by the winding machine pulling the main suspension cable 3, the brake arrangement 1 is also moving upwardly along with the elevating work platform 2, the guide rail 5 is moving downwardly which drive the roller 43 to rotate in a clockwise direction (as shown in FIG. 10). The roller 43 would move down to the wider bottom portion of the gain 17, thus the elevating work platform 2 can continuously move upwardly.

When the winding machine is overloaded, or its brake is failed, the elevating work platform 2 would start to slide downwardly that would also bring the brake arrangement 1 to slide downwardly. The guide rail 5 however is moving in an upwardly direction which drive the roller 43 to rotate in a counterclockwise direction (as shown in FIG. 9). The roller 43 would move up to the narrower top portion of the gain 17, and shortly locked the guide rail 5 with the vertical wall 173 of the gain 17 to stop the downward movement of the elevating work platform 2.

In accordance with the preferred embodiments described above, the preferred embodiments are just an example of what the present invention can accomplish, therefore they should not be used as a limitation of what the present invention can achieve. The limitation are therefore should be referring to the claim section for judging of equivalent infringement.

What is claimed is:

1. A braking arrangement for elevating work platform, comprising a brake body, a C-shaped receiving piece, a braking unit, and a brake released handle, wherein said brake body comprises a top surface, a bottom surface, a front surface, a rear surface, a first side surface, and a second side surface form six surfaces of said brake body;

said brake body having a gain passing through from said top surface to said bottom surface with a narrower top portion near said top surface, and a wider bottom portion near said bottom surface;

said gain is limited and defined by a front wall parallel to said front surface of said brake body, a rear wall parallel to said front wall, a vertical wall parallel to said first side surface of said brake body, and an inclined wall disposed oppositely to said vertical wall; said front wall and said rear wall each respectively provided a front slide way and a rear slide way parallel to said inclined wall; said front surface of said brake body having an opening for providing an access to said gain; said brake body further having a counter bore penetrates through said first side surface of said brake body until said vertical wall of said gain;

said C-shaped receiving piece having a screw hole in aligned with said counter bore of said brake body on said first side surface, and a C-shaped groove facing said inclined wall of said brake body when said C-shaped receiving piece is affixed on said vertical wall within said gain of said brake body through a counter sunk bolt penetrating through said counter bore to be screwed on said screw hole of said C-shaped receiving piece;

said braking unit comprises a brake mount having a width slightly smaller than a distance between said front wall and said rear wall of said gain of said brake body, two roller support stands having an axial hole at each of said roller support stands respectively, are parallelly and integrally extended from a first end of said brake mount, a roller having a coarse surface is pivotally mounted between two roller support stands by a pivot axle penetrating through said axial hole of said roller support stands and said roller, and a fulcrum bar integrally extended from a second end of said brake mount, wherein said pivot axle has a length that is longer than a distance between two parallel roller support stands, a protruded portion of said pivot axle is rotatably mounted in said front slide way and said rear slide way of said gain of said brake body, so that said roller is able to rotate on said inclined wall of said gain;

said brake released handle has a front end pivotally connected to said fulcrum bar of said braking unit, a middle portion pivotally mounted on said elevating work platform; during normal operation of said elevating work platform, said brake released handle is pushed upward which control said fulcrum bar to also push upward, so that said elevating work platform is only able to move upwardly; when the construction worker released said brake released handle from a rear end of said brake released handle, said fulcrum bar is turned down so that said braking unit is released and said elevating work platform can safely move downwardly.

* * * * *